July 26, 1932. G. G. KRUESI 1,868,945

RADIO DIRECTION FINDER

Filed Nov. 25, 1930  2 Sheets-Sheet 1

Inventor
Geoffrey Gottlieb Kruesi
By Lyon & Lyon
Attorneys

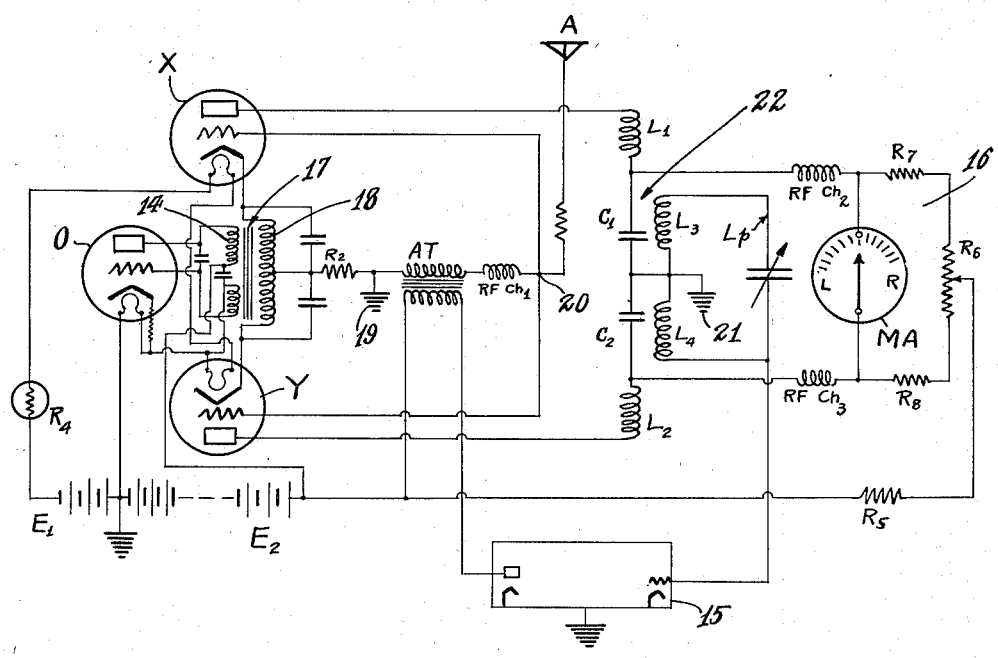

Patented July 26, 1932

1,868,945

UNITED STATES PATENT OFFICE

GEOFFREY GOTTLIEB KRUESI, OF ALHAMBRA, CALIFORNIA, ASSIGNOR, BY MESNE ASSIGNMENTS, TO BENDIX AVIATION CORPORATION, OF SOUTH BEND, INDIANA, A CORPORATION OF DELAWARE

RADIO DIRECTION FINDER

Application filed November 25, 1930. Serial No. 498,066.

My invention relates to direction finding apparatus and has particular reference to a system for employing received radio currents for indicating the direction between the receiving apparatus and the transmitting station.

In the operation of air transport systems, it is desirable that pilots on planes may be supplied with information as to the location of landing fields, relative to the position of the plane at any given time.

Due to atmospheric conditions such as fog, clouds, etc., it is frequently impossible for the pilot to observe a landing field at which he desires to land the plane, and hence it is necessary that he shall be provided with instruments which will denote the location of the field independent of the visibility thereof.

I have discovered that by transmitting a radio signal from a landing field and providing the plane with a receiving device which will receive the transmitted signal upon both an antenna and a loop, the direction of movement of the plane relative to a straight line between the plane and the landing field may be readily indicated upon a direction indicating instrument.

It is therefore an object of my invention to provide a radio receiving system which will receive a radio signal on both an antenna and a loop and combine the currents so received to determine the direction of the loop relative to a straight line between the receiving apparatus and the transmitting station.

Another object of my invention is to provide a system of the character described in the preceding paragraph in which a direction indicating instrument in the form of a volt meter or ammeter will have its needle diverted from a central zero position either to the right or to the left thereof by an amount corresponding to the angular deviation of the loop relative to a straight line between the receiving apparatus and the transmitting station.

Another object of my invention is to provide a direction finding apparatus in which a radio receiving device is arranged to receive a radio signal on both an antenna and a loop in which the radio frequency received by the antenna is modulated by a predetermined low frequency and the original radio frequency is eliminated, and in which current received by the loop is combined with the modulated frequency and is detected to give a current of the same low frequency, the amplitude of which and phase relation of which to the original low frequency depends upon the angle and the direction of the deviation of the loop.

Another object of my invention is to provide a direction indicating device in which a rado frequency wave from a transmitting station is received upon both an antenna and a loop connected in the direction indicating device; in which the radio frequency wave received by the antenna is modulated by a predetermined low frequency received by the loop and impressed upon the loop, and in which the current received in the loop is combined with the predetermined low frequency in such way as to cause an unbalancing of a bridge circuit by an amount and in a direction corresponding to the angle of deviation of the loop from a straight line between the transmitting station and the loop.

Another object of my invenion is to provide a direction finding system of the character described in which the number of pieces of apparatus required and their weight may be small to reduce the weight required to be carried by an airplane.

Another object of my invention is to provide a system in which the direction finding apparatus may be constructed as a unit to be adapted to the usual broadcast receiving station provided on the plane to reduce the weight and space required for the direction finding system.

Another object of my invention is to provide a direction finding device in which a single set of vacuum tubes is used as both a balanced modulator in which the carrier frequency is eliminated, and as a detector for low frequency currents.

Another object of my invention is to provide a direction indicating apparatus in which a single indicating instrument will be affected by a radio wave from a transmitting station to indicate the angle of deviation of the plane from a straight line to the transmitting station and which will indicate whether the plane is flying toward or away from the transmitting station.

Other objects of my invention will appear from a study of the following specification read in connection with the accompanying drawings in which Figure 1 is a diagrammatic view illustrating the relative position of an airplane and a transmitting station with a loop antenna arranged thereon in accordance with my invention.

Figure 4 is a diagrammatic view illustrating the wiring system of the receiving device to be carried upon the plane.

Figure 1:
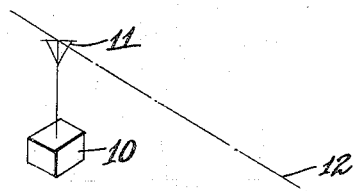
Figure 1:
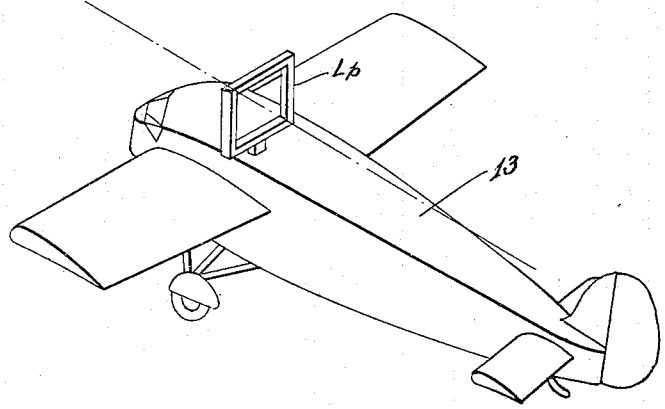
Figure 2:
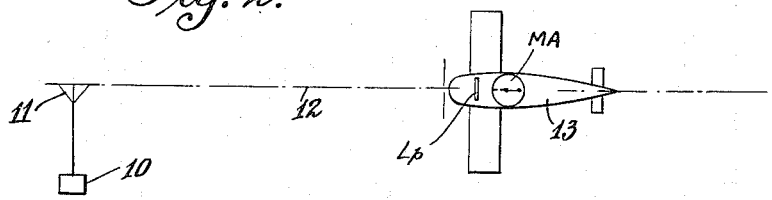
Figure 2 is a diagrammatic view of an airplane and a transmitting station illustrating the direction in which the indicating needle will point when the airplane is pursuing a course along a straight line between the airplane and a transmitting station.
Figure 3:
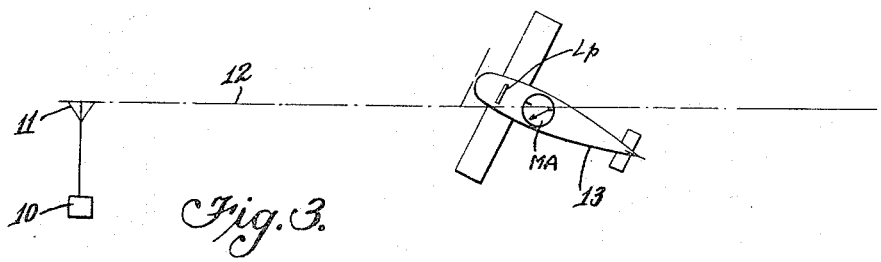
Figure 3 is a diagrammatic view of an airplane illustrated relative to a transmitting station and illustrating the direction of the needle of the indicating instrument when the plane is moving along a course at an angle to the straight line between the plane and the transmitting station.

Referring to the drawings, I have illustrated in Figure 1 a transmitting station 10, to be located at a landing field, and having antenna represented at 11. The radio wave will be transmitted, of course in all directions but relative to the plane, it will assume a path represented by the dotted line 12. An airplane 13 is illustrated as being provided with a loop aerial $L_p$ fixed with reference to the major axis of the airplane so that no current is induced in the loop when the airplane is directed in the line connecting the transmitter and receiver. It will be understood that the airplane 13 is provided with an antenna aerial (not shown) which may be used for any of the purposes for which an antenna is usually provided upon an airplane, for example, to operate the usual broadcast receiving set carried by the airplane for receiving weather reports and for radio telephonic communication with the landing field.

Referring particularly to Figure 4, I have illustrated an indicating system which is adapted to be employed in connection with the usual radio receiving set 15 carried by the airplane, this indicating system including an indicating instrument, illustrated as a milliammeter MA which is connected across a bridge circuit 16, two legs of which are formed respectively by a fixed resistor $R_7$ and a portion of a variable resistor $R_6$ and a second fixed resistor $R_8$ and the remaining portion of the resistor.

The circuit connections illustrated in the left hand portion of Figure 4 are somewhat similar to the so-called "balanced modulator circuit" familiar to those skilled in carrier current telephony. Briefly, the connections include an oscillator circuit which includes an oscillator tube O, (illustrated as of the separately heated cathode type), having its filament connected to a source of potential $E_1$, the circuit being tuned to oscillate at a predetermined low frequency V. Hence, the oscillator acts as a source of alternating current of constant amplitude and of a frequency V. The plate and grid of the oscillator tube O are connected in the usual manner to opposite ends of a primary coil 14 of a low frequency transformer 17. The secondary winding 18 on the transformer 17 is illustrated as having one of its ends connected to the cathode of a tube X, while the other of its ends is connected to the cathode of a tube Y, the mid-point of the coil being connected to ground at 19 through resistor $R_2$.

Thus, the oscillator will cause a current to flow in the plate circuit for tube X at a frequency V and of a constant amplitude.

At the same instant a corresponding current will flow through the plate circuit of the tube Y, this current having a frequency V and being of constant amplitude. At any given instant however, the potentials in the two plate circuits will be equal but 180° out of phase, the currents changing in sign at the frequency with which the potential varies.

Plate circuit for tube X is illustrated as including a coil $L_1$, and the upper right hand leg of the bridge circuit 16 (the resistance $R_7$ and upper portion of the variable resistance $R_6$). The plate circuit for tube Y includes a coil $L_2$ and the lower right hand leg of bridge 16 (resistor $R_8$ and the lower portion of the variable resistance $R_6$).

The coils $L_1$ and $L_2$ are illustrated as comprising the primary windings of a radio frequency transformer 22, the secondary coils $L_3$ and $L_4$ of which are illustrated as being connected in the loop circuit $L_p$. An antenna aerial A is illustrated as being connected through a resistor $R_1$ to a common junction point 20 from which a branch circuit extends to the grids of each of the tubes X and Y so that radio frequency currents received by the antenna A will be impressed upon the grids of the tubes X and Y.

The loop circuit $L_p$ is illustrated as being connected through a radio frequency amplifier and detector device 15 which, as hereinbefore stated, may comprise the usual broadcast receiving set normally carried by a plane. From the amplifier and detector 15, a circuit is illustrated as extending to a low frequency transformer AT, the secondary coil of which is connected through a radio-frequency choke-coil $RFCH_1$ to the common junction point 18.

The operation of my system will best be understood with reference to an assumed operation.

With no incoming signal, the circuit illustrated will produce an alternating current output in the plate circuits of tubes X and Y which will have a direct current component. However, the direct current component which passes through the coil $L_1$ and through the upper leg of the bridge circuit 16 and the current from the tube Y through the coil $L_2$ and the lower leg of the bridge 16 will generally be equal to each other and will cause no difference of potential across the terminals of the indicating instrument MA. If, however, it occurs that there is a difference in potential across the terminals of the indicating instrument MA the resistance $R_6$ may be adjusted until under these conditions, no current flows through the indicating instrument MA.

On the other hand, in the absence of the modulating potential $E_1$ supplied to the tubes X and Y, any current which is received by the antenna A will induce currents in the plate circuits of the tubes X and Y, which will pass respectively through the coils $L_1$ and $L_2$. If the sense of direction of these coils is properly selected, they will be equal to each other and will oppose each other so as to induce no potential in the secondary windings $L_3$ and $L_4$.

Assuming now, that current is received from a transmitting station upon the antenna A, this current, which is of a radio frequency, will be impressed upon the grids of both tubes X and Y, the effect upon both grids being equal and in phase.

Due to the well known operation of the balanced modulator there will be produced in the plate circuit for tube X and the plate circuit for tube Y, two radio frequencies which will be respectively equal to the radio frequency W plus the low frequency V and the radio frequency W minus the low frequency V. However, it will be understood that the original radio frequency W is eliminated in the balanced modulator and is not passed through the plate circuits.

The connection of the plate circuits through the coils $L_1$ and $L_2$ coupled to the loop $L_p$ will impress upon the loop $L_p$ the two currents having the frequencies stated above, this it, $W+V$ and $W-V$.

However, the loop $L_p$ will be receiving the current transmitted from the transmitting station 10 and will therefore have impressed therein a current of the transmitted frequency W so that in the loop circuit there are present three frequencies, $W$, $W+V$ and $W-V$. However, it will be understood that the directly received current in the loop will have an amplitude dependent upon the deviation of the normal of the loop (the perpendicular to the plane of the loop) relative to the straight line between the transmitting station and the loop and will have a phase dependent upon whether the loop is angled to the right of or to the left of the straight line. As is well known in the radio art, these frequencies $W$, $W+V$ and $W-V$ constitute a radio frequency current of frequency W modulated by the lower frequency V and having an amplitude dependent upon the angle of deviation of the loop and having a phase dependent upon the direction of such deviation.

The currents in the loop $L_p$ are then carried through the radio frequency amplifier (if desired) and detector 15 to impress upon the low frequency transformer AT the detected current having frequency V which will in turn be passed from the secondary winding of the transformer AT through the radio-frequency choke-coil $RFCH_1$ to the grids of both tubes X and Y. It will be observed that the current of frequency V produced by amplification and detection of the loop current will be impressed upon both of the tubes X and Y in phase.

However, as hereinbefore explained, the original frequency V impressed upon the tubes X and Y by the oscillator O will produce in the two tubes a current having a frequency V which is equal in amplitude in the two tubes but which has a phase difference of 180° between the tubes X and Y.

Hence, the current of frequency V from the detector will add to the original current in the tube X at the same instant at which it will subtract from the current in the tube Y.

It will be observed that the grids of the tubes X and Y are connected in the plate circuit of these tubes respectively through a resistor $R_2$ connected between the cathodes of the tubes and the ground at 19 so that a negative bias is provided for the grids of these tubes to cause them to operate upon one of the curved portions of the grid potential-plate current curve.

Thus the two currents of frequency V in the tube X and Y (one produced by the oscillator O and the other produced from the detector) will combine to increase the alternating current potential at frequency V applied to the grid of one of the tubes, say for example, tube X, and will combine to decrease the alternating current potential of frequency V applied to the grid of the other tube V.

This will cause a change, say an increase, in the direct current component of the plate circuit in the tube X and an opposite change, say a decrease, in the direct current component of the plate circuit in tube Y so that a greater current will flow through the upper half of the bridge circuit 16 and a lesser current will flow through the lower half of the bridge circuit.

This unbalancing of the currents in the upper and lower halves of bridge circuits 16 will cause a difference in potential across the terminals of the indicating instrument MA and the needle thereof will be deflected.

The amount of difference between the current in the upper half of the bridge circuit and in the lower half will depend upon the amplitude of the current received by the loop which, as will be understood, will depend upon the angular deviation of the loop from the straight line to the transmitting station. Hence, the difference between the current flowing in the upper half of the bridge circuit 16 and in the lower half thereof will cause current to flow through the indicating instrument MA to cause a deflection of the same by an amount proportional to the difference in the current in the upper and lower halves respectively of the bridge circuit.

Assuming that the deviation of the loop herein described was to the right, the indicating instrument may be so arranged as to cause the needle to point to the left. That is, the pilot will know that he must swing his plane to the left in order to bring it back into alignment with the straight line to the broadcasting station.

Now assuming that the loop is turned from a position to the right of the straight line to a new position to the left of the straight line as by swinging the plane to the left of its proper course. If the amount of deviation to the left is equal to the amount of deviation hereinbefore described as to the right of the straight line, current of frequency W received by the loop will have the same amplitude in the two cases but the phase of this current will differ by an angle of 180°. It can be shown that this will produce in the rectified current of frequency V a current which has the same amplitude in the two cases but which differs in phase by 180°. This effect will be such that if the loop is deviated to the left of the straight line the addition of the currents would occur in the tube Y and the subtraction of the currents would occur in tube X so that there would be a greater current flow in the lower half of the bridge 16 and a lesser flow in the upper half thereof and the indicating instrument would therefore be deflected by an amount equal to the angular position of the loop but on the opposite side of the zero point of the instrument.

It will also be observed that the original installation may be so arranged that when the plane is flying toward the transmitting station but is off the course by an angle to the right of the straight line between the transmitting station and the plane, the indicating needle on the instrument MA will be deflected toward the left so that the pilot will understand that he must turn the plane to the left in order to bring the plane back to its true course. With this original arrangement, it therefore follows that if the plane is flying away from the station and is angled to the left of the straight line, the indicating instrument will point to the left, so that if the pilot follows the normal operation of swinging the plane to the left to bring it back to its course, the indicating instrument MA will swing further to the left instead of realigning itself with the zero calibration.

Hence, my direction indicating device is adaptable not only to indicate whether the pilot is on a desired course or not but is also adapted to indicate to the pilot whether he is flying toward or away from the transmitting station. This is an important feature of my invention since it frequently happens that a pilot may be in alignment with a proper course but traveling in the opposite direction, which, unless the plane is provided with a magnetic compass renders the direction finding device substantially useless.

It will be observed that the direct current is prevented from being short circuited to ground at 21 by the interposition in the circuits of the coils $L_1$ and $L_2$, the stopping condensers $C_1$ and $C_2$ respectively which will permit radio frequencies to pass but will not permit the direct current to pass therethrough.

While I have illustrated no tuning devices in the antenna circuit it will be understood that if desired the antenna circuit may be provided with suitable variable inductance or capacity to permit the circuit to be tuned to any desired frequency. However, it is not essential that the antenna be so tuned since the loop $L_p$ is illustrated as having a variable condenser C located therein so that this loop may be tuned to the frequency of the wave sent out by the transmitting station at the landing field. Since the effective current in the loop circuit to be utilized is that having the frequency V, resulting from the combining of the frequency W to which the loop is tuned with a frequency W+V and W−V resulting from reception of the same frequency wave by the antenna, it will be understood that the tuning of the loop alone will be sufficient to insure selection of the proper transmitting station.

In view of the fact that the loop $L_p$ is actually caused to perform the selecting operations, it will therefore be apparent that the loop may be tuned to the frequency of any broadcasting station, the location of which is known and the indicating instrument will be deflected to the right or to the left depending upon the position of the loop relative to a straight line to that broadcasting station which is tuned in.

It will also be observed that the single set of tubes X and Y are arranged to act not only as a balanced modulator for the system but also acts as a detector for the low frequency currents desired to be added together to give the desired indication. By such an arrangement the number of pieces of apparatus which are required and the weight required for the instrument is materially reduced, a factor which is of importance in aviation instruments.

It will also be observed that while there may be many frequencies present in the loop $L_p$ the only frequency which is effective to operate upon the indicating device is that frequency which corresponds to the oscillation frequency supplied by the oscillator O. Hence other frequencies which may be present are filtered out and do not affect the operation of my instrument.

It has been both theoretically and experimentally determined that the incoming signal received by the antenna and loop may be any frequency and may be modulated by any low frequency and the apparatus will perform satisfactorily. Thus, no special station need be employed for transmitting purposes but any broadcasting station may be used for direct indicating purposes so long as the location of the station is known.

While I have illustrated and described the preferred embodiment of my invention, I do not desire to be limited to any of the details shown or described herein except as defined in the appended claims.

I claim:

1. In a direction finding device, means for receiving a radio frequency current from a transmitting station, means for producing from said received current two alternating currents of the same frequency and of substantially the same amplitude but differing in phase, a second means for receiving a radio frequency current from the transmitting station and having directional characteristics, means for producing from such received current an alternating current of the same frequency as said first named currents, having an amplitude dependent upon the deviation of said last named receiver from a straight line to said transmitting station, and being in phase with one of said first named alternating currents, and means for separately combining said last named current to both of said first named currents, to produce two currents differing in value by some function of the angle of deviation of said receiver.

2. In a direction finding device, means for producing a current of known frequency and constant amplitude, means including a loop aerial for receiving radio frequency current from a transmitting station, means for producing from said received radio frequency current a current of the same frequency as said known frequency, and of an amplitude dependent upon the angle of deviation of the loop from a straight line between the loop and the transmitting station, means for combining said currents of said known frequency, and an indicating means operably responsive to the added currents for indicating the angle of the loop relative to the line to the transmitting station.

3. In a direction finding device, means for producing a current of known frequency and constant amplitude, a balanced modulator connected to be affected by said produced current, means for receiving a radio frequency current from a transmitting station including an antenna aerial and a loop aerial, means connecting said antenna aerial to said balanced modulator, means coupling the output of said modulator to said loop aerial to produce therein currents of the received frequency added to the known frequency but eliminating the received frequency, means for detecting the current in the loop produced in the loop by the combined effects of the directly received radio wave and the currents induced through the action of the modulator, the detected current having the known frequency and having an amplitude dependent upon the angle of deviation of the loop from the straight line between the transmitter and loop, means for combining the two currents of said known frequency and an indicating device operably responsive to the added currents for indicating the angle between the loop and said straight line.

4. In a direction finding device, means for producing a current of known frequency and constant amplitude, a pair of vacuum tubes the grids of which are connected to said source of known frequency current to produce in the plate circuits of said tubes two currents of known frequency and equal amplitude but of 180° phase difference, an antenna aerial for receiving a transmitted radio frequency wave, and connected to the grids of said tubes to produce in the plate circuits currents having frequencies of the received wave plus and minus the known frequency, a loop aerial for also receiving said transmitted wave, means coupling said loop to the plate circuits of said tubes to impress on the loop the frequencies produced in said tubes, means for detecting the resulting current of known frequency produced in said loop, said current being of an amplitude dependent upon the angle of deviation of said loop from the straight line between the transmitter and said loop and differing in phase dependent upon whether the loop is deviated to the right or left of said line, and means for supplying said detected current to the grids of said tubes to vary the direct current output of each dependent upon the phase of said detected current and upon the amplitude thereof.

5. In a direction finding device, a balanced modulator, a source of current of predetermined frequency connected to said modulator to cause the output currents therefrom to differ substantially in phase and to have some frequency determined by the predetermined frequency from said source, a loop aerial for receiving a radio frequency wave from a transmitter, an antenna for also receiving said radio wave from said transmitter connected to the input circuits of both sets of said modulator said loop aerial being coupled to the output circuits of said modulator to have the output currents from said modulator impressed on the loop, means for detecting a current from said loop of said predetermined frequency and for supplying said detected current to both sides of said modulator in phase to add to the output of one side of the modulator and to subtract from the output of the other side, and means to differentiate between the direct current output of the two sides of said modulator to thereby indicate the degree of deviation of the loop from a straight line between the loop and transmitter and to indicate the direction of such deviation.

6. In a direction finding device, a balanced modulator, a source of current of predetermined frequency connected to said modulator to cause the output currents therefrom to differ substantially in phase and to have some frequency determined by the predetermined frequency from said source, a loop aerial for receiving a radio frequency wave from a transmitter, an aerial for also receiving said radio frequency wave from said transmitter connected to the input circuit of said balanced modulator, said loop aerial being coupled to the output circuits of said modulator to have the output currents from said modulator impressed on the loop, means for detecting a current from said loop of said predetermined frequency, and means for adding the direct current component of the current so detected to the direct current component of the current produced by the modulator to indicate the angle of deviation of the loop from the straight line between the loop and transmitter.

7. In a direction finding device, a balanced modulator, a source of current of predetermined frequency connected to said modulator to cause the output currents therefrom to differ substantially in phase and to have some frequency determined by the predetermined frequency from said source, a loop aerial for receiving a radio frequency wave from a transmitter, an aerial for also receiving said radio frequency wave from said transmitter connected to the input circuit of said balanced modulator, said loop aerial being coupled to the output circuits of said modulator to have the output currents from said modulator impressed on the loop, means for detecting a current from said loop of said predetermined frequency, and means for passing the current so detected in phase to the direct current output circuits of both sides of the modulator to add the direct current components of the detected current to the direct current component from one side of the modulator and to subtract the direct current component of the detected current from the direct current component from the other side of the modulator and thus determine the angle and the direction of the deviation of the loop from the straight line between the transmitter and the loop.

8. In a direction finding device, a balanced modulator, a source of current of predetermined low frequency connected to said modulator to cause the output currents therefrom to differ in phase by 180°, means for supplying to said modulator a radio frequency current received from a transmitting station to cause the output circuit of one side of said modulator to produce a current having a frequency equal to the radio frequency plus said low frequency and to cause the other side of said modulator to produce a current having a frequency equal to the radio frequency minus said low frequency, the amplitude of the currents produced by both sides of the modulator being equal, a loop aerial for receiving the same radio frequency current from said transmitting station, means coupling the output circuits of both sides of said modulator to said loop to produce in said loop a current modulated by said low frequency, and of an amplitude determined by the angle of deviation of said loop from a straight line between the loop and said transmitting station, means for detecting said low frequency current, and means for adding said low frequency current so produced to the currents produced in both sides of said modulator to thereby determine the angle of deviation of said loop.

9. In a direction finding device, a balanced modulator, a source of current of predetermined low frequency connected to said modulator to cause the output currents therefrom to differ in phase by 180°, means for supplying to said modulator a radio frequency current received from a transmitting station to cause the output circuit of one side of said modulator to produce a current having a frequency equal to the radio frequency plus said low frequency and to cause the other side of said modulator to produce a current of a frequency equal to the radio frequency minus said low frequency, the amplitude of the currents produced by both sides of the modulator being equal, a loop aerial for receiving the same radio frequency current from said transmitting station, means coupling the output circuits of both sides of said modulator to said loop to produce in said loop a current modulated by said low frequency, and of an amplitude determined by the angle of deviation of said loop from a straight line between the loop and said transmitting station, and means for detecting said low frequency current in said loop and for supplying said current to both sides of said modulator in phase, whereby on one side of said modulator said currents will be added and on the other side of said modulator the currents will be subtracted.

10. In a direction finding device, means for receiving a radio frequency current from a transmitting station, including an antenna aerial and a loop aerial for receiving the same transmitted wave, a source of predetermined low frequency, means for producing from the wave received by the antenna a pair of currents, one having a frequency equal to the sum of the radio frequency and the low frequency, the other having a frequency equal to the difference of the radio frequency and the low frequency, means for impressing said two produced frequencies upon the loop, means for detecting from these frequencies a low frequency current, and means for adding the low frequency current, which is generated and produced in the loop as a result of the super-position of the directly received radio frequency and the two produced frequencies, to the original low frequency current, to determine the angle of deviation of the loop from a straight line between the loop and the transmitting station.

11. A method of determining the angle of deviation of a loop aerial from a straight line between the loop and a transmitting station, which consists in impressing upon the loop a pair of currents having a frequency respectively equal to the frequency of the transmitted current plus a predetermined frequency from a separate source, and the frequency of the received current minus the same predetermined frequency, detecting the resultant loop current having the predetermined frequency, and adding the amplitude of said detected current to the amplitude of said current from said separate source.

12. The method of determining the angle of deviation of a loop aerial from a straight line between said loop and a transmitting station, which consists in generating two currents of equal amplitude, equal predetermined frequency and opposite in phase, super-positioning upon each of said currents the received current from the transmitting station to produce two currents, one having a frequency equal to the received frequency plus the frequency of said generated current, and the other having a frequency equal to the received frequency minus the generated frequency, supplying said two currents to said loop, detecting from the loop current a current having the same frequency as said generated frequency, adding said detected current to the two generated currents of said predetermined frequency, and measuring the difference between the currents produced by the sum of the detected current and one of the generated currents and that produced by the sum of the detected current and the generated current which is 180° out of phase.

13. In a direction finding device, two means for receiving a transmitted radio frequency current one of which has a directional characteristic and which is relatively fixed with respect to the other of said means, means for locally producing a current having a known frequency, means for combining said locally produced current and said received current from both of said receivers to produce another current of the same frequency as said known frequency, the amplitude of which depends upon the deviation of the directional receiving apparatus from a straight line between the receiving means and the transmitting station, and means for indicating the amplitude of said last-named current as a function of said deviation.

14. In a direction finding device, means for receiving a transmitted radio frequency current, means for locally producing a current having a known frequency, means combining said received current with said locally produced current to produce currents having frequencies equal to the sum and difference of the frequency of the locally produced current and that of the received current and of constant amplitude, a second means for receiving said transmitted current and having a directional characteristic, the amplitude of the current in the last named receiving means varying with the angle of deviation of said receiver from a straight line to the transmitting station, and means for combining said sum and difference frequencies with said last named received frequency to produce a current of said known frequency the amplitude of which is dependent upon the angle of deviation of said receiver from said straight line.

15. In a direction finding device, means for receiving a radio frequency current from a transmitting station, means for producing from said received current two alternating currents of the same frequency and of substantially the same amplitude but differing in phase, a second means for receiving a radio frequency current from the transmitting station and having a directional characteristic, means for producing from such received current an alternating current of the same frequency as said first named currents, having an amplitude dependent upon the deviation of said last named receiver from a straight line to said transmitting station, and being in phase with one of said first named alternating currents, means for separately adding said last named current to both of said first named currents, to produce two currents differing in value by some function of the angle of deviation of said second-named receiver, and an indicating instrument for measuring the difference between said two produced currents and for indicating whether said second-named receiver is directed toward or away from said transmitting station.

16. In a radio direction finding system, means for receiving a transmitted radio frequency current, means for generating a local alternating current having a known audio frequency, means for producing two currents of like frequency but opposite phase from said locally generated audio frequency current and said received current, said currents being equal in magnitude when the receiving means is in a certain position with respect to the direction of the received current and varying in opposite senses when the position of said receiving means is changed in one direction or another so that one or the other of said currents predominates, means for producing from said currents a resultant current which is a function of the change of position of said receiving means, and means for indicating the changes in said resultant current.

17. In a radio direction finding system, means for receiving a transmitted radio frequency current, means for generating a local current having a known frequency, means for producing from said locally generated current and said received current two currents having opposite phases but equal magnitudes when the receiving means is in a certain position with respect to the direction of the received current, said currents varying in opposite senses when the position of said receiving means is changed in one direction or another so that one or the other of said currents predominates, means for combining said currents to produce a resultant current which is a function of the change of position of said receiving means, and means for indicating the changes in said resultant current.

18. In a radio direction finding system a directional antenna for receiving a transmitted radio frequency current, means for deriving from said received current two currents of like frequency but opposite phase, said currents being equal in magnitude when the directional antenna is in a certain position with respect to the direction of the incoming received current and varying in inverse proportions when the position of said antenna is changed in one direction or the other so that one or the other of said currents predominates, and means for indicating the difference between said currents, said difference being a function of the angular position of the directional antenna with respect to the direction of the incoming signal.

19. In a radio direction finding system a directional antenna for receiving a transmitted radio frequency current, means for deriving from said received current two currents of like frequency but opposite phase, said currents being equal in magnitude when the directional antenna is in a certain position with respect to the direction of the incoming received current and varying in inverse proportions when the position of said antenna is changed in one direction or another so that one or the other of said current predominates, means for combining said currents to produce a resultant current which is a function of the change of position of said directional antenna, and means for indicating the changes in said resultant current.

20. A method of indicating the direction of an incoming radio frequency current which method consists in receiving said radio frequency current generating a local current having a known frequency, combining said locally generated current with said received current to produce two currents of like frequency but opposite phase, said currents being equal in magnitude when the received current is coming from a certain direction and varying in inverse proportions when the incoming current is coming from one direction or another at an angle to the first direction so that one or the other of said currents predominates, combining said currents to produce a resultant current which is a function of the direction of the incoming current, and indicating the magnitude and direction of said resultant current.

21. A method of indicating the direction of an incoming radio frequency current which method consists in deriving from said received current two currents of like frequency but opposite phase, said currents being equal in magnitude when the received current is coming from a certain direction and varying in inverse proportions when the received current is coming from a direction to the left or right of the first direction so that one or the other of said currents predominates, combining said currents to produce a resultant current which is a function of the direction of the incoming current, and indicating the magnitude and direction of the resultant current.

Signed at Los Angeles, California, this 20th day of November, 1930.

GEOFFREY GOTTLIEB KRUESI.